Patented Mar. 25, 1930

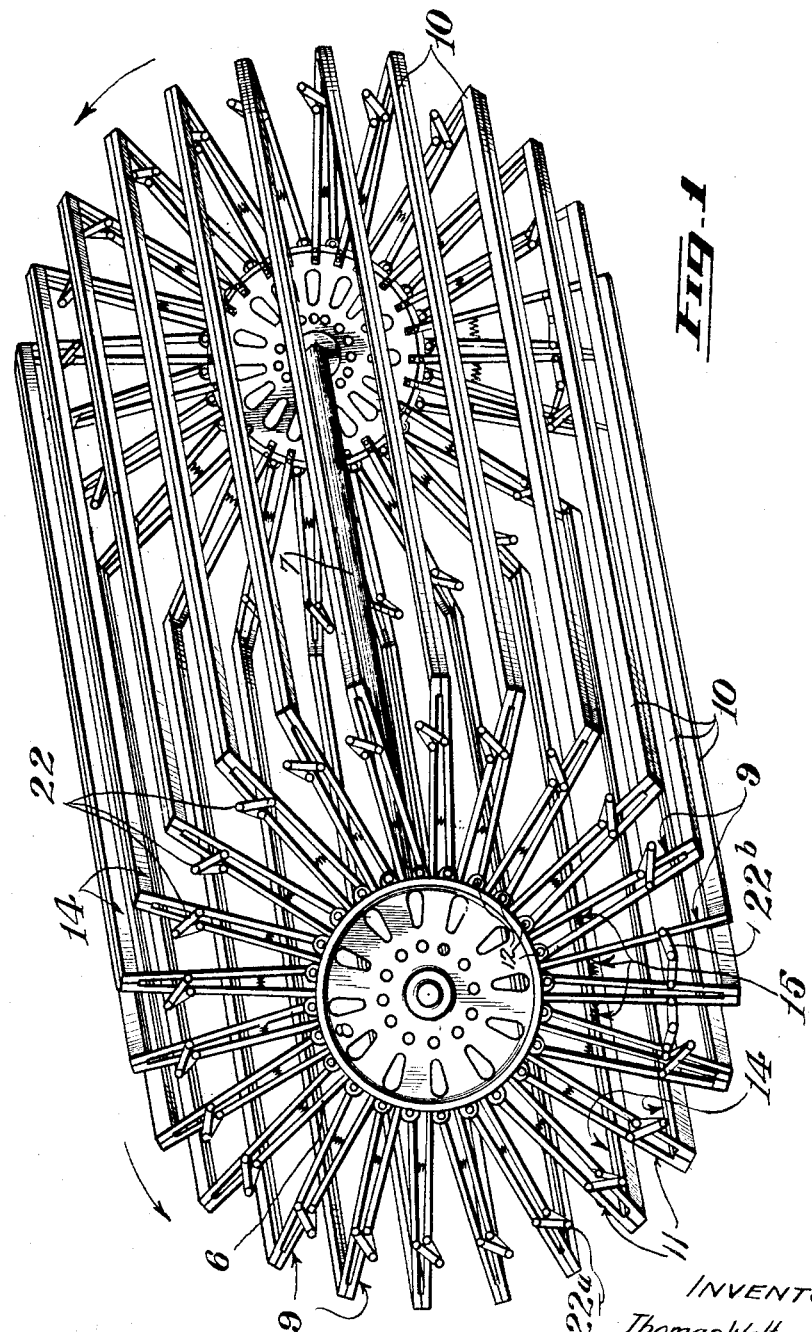

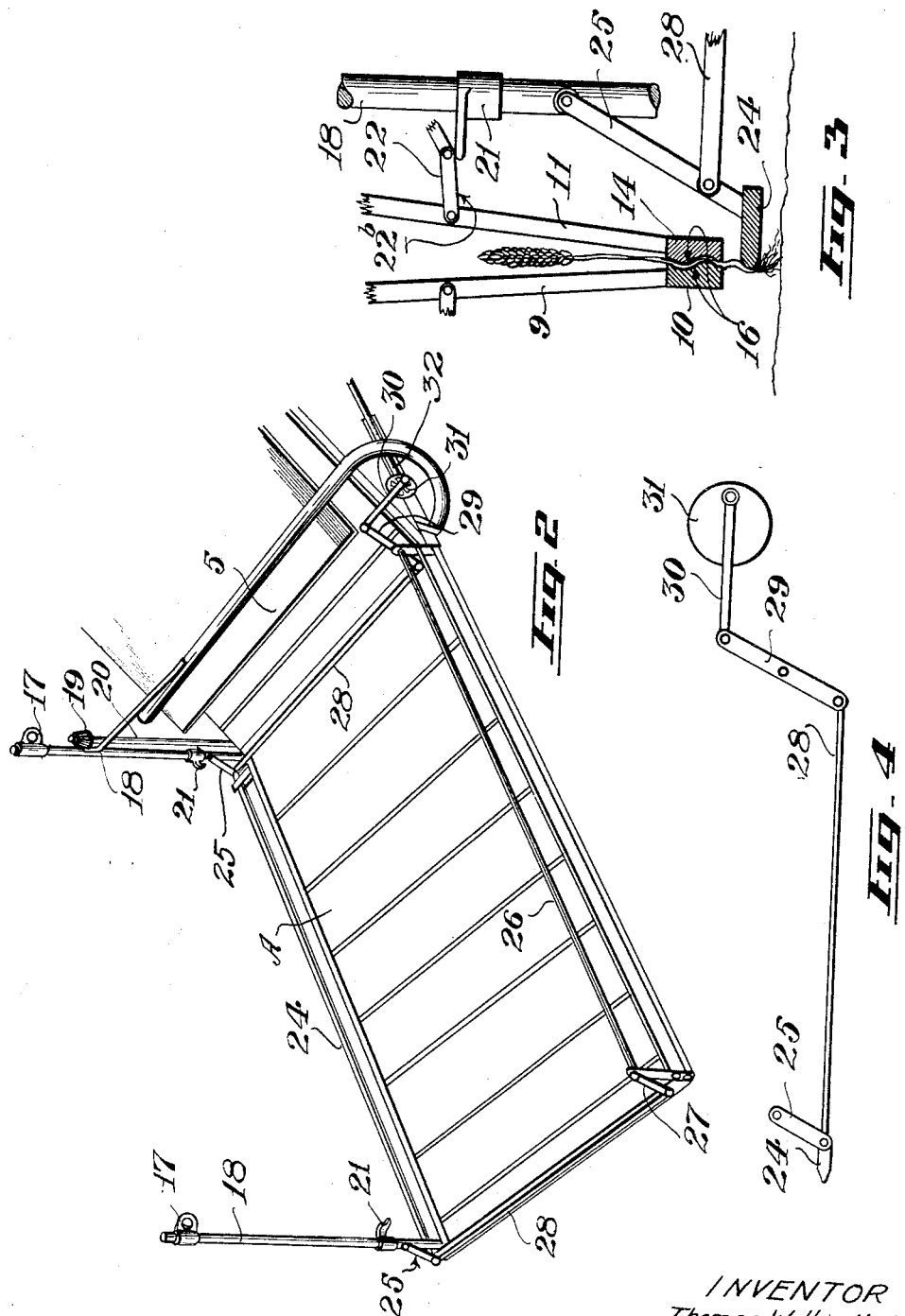

1,751,916

UNITED STATES PATENT OFFICE

THOMAS WALTER HALL, OF LEONARD, ONTARIO, CANADA

FLAX-PULLING MECHANISM

Application filed April 8, 1927, Serial No. 182,049, and in Canada April 14, 1926.

This invention relates to improvements in flax pulling mechanism capable of attachment to and actuation by a binder of conventional design whereby the same may be transformed to serve the purpose of and be utilized as a flax puller.

An object is to provide a suitable mechanical device capable of satisfactorily pulling the stalks bodily from the ground, that will operate quickly and economically and will adequately and efficiently perform the functions required of it, thus successfully replacing the old custom of pulling by hand.

A further object is to provide an improved reel that will perform the dual function of carrying the stalks toward the table and gripping the same to pull them out of the ground, subsequently releasing such stalks and depositing them on the table conveyor.

A further object is to provide an auxiliary stalk pulling element to co-operate with the reel, that is reciprocated back and forth in unison with the passing of the reel arms, this auxiliary pulling element operating to kick the lower end of the stalk just as the reel pulling mechanism has pulled the same taut so that roots of the stalk are thus jerked out of the ground.

A still further object is the provision of such a pulling mechanism that may be attached to a harvester or incorporated in a special machine designed only for flax pulling, is characterized by simplicity of design and ease of operation and is capable of production at a reasonable cost, the same being thereby rendered commercially desirable.

To the accomplishment of these and related objects as may become apparent as the description proceeds, the invention resides in the construction, combination and arrangement of parts as shall be hereinafter more fully described, illustrated in the accompanying drawings and pointed out in the claims hereunto appended.

So that the invention will be best understood and most clearly described, reference is had to the drawings forming a part of this specification wherein:

Fig. 1 is a perspective view of my improved flax pulling reel;

Fig. 2 is a perspective of the harvester table equipped to receive this reel;

Fig. 3 is a detail in sectional elevation of the co-operating flax pulling elements (i. e., the flax pulling reel and the stalk kicker) as in operation, and Fig. 4 is an elevation diagram of the kicker mechanism.

Particular reference is now had to these drawings, wherein like characters indicate like parts throughout the several views, the binder being designated by the numeral 5. From this binder have been removed the cutting knives and the usual reel and in their stead has been applied the flax pulling mechanism comprising essentially a reel 6 formed as an ordinary reel with an axle 7, spaced hubs 8 on the ends thereof from which extend rigid radial arms 9 and the usual longitudinally extending grain-beating slats 10 joining the ends of corresponding radial arms on the opposite hubs. Intermediate of these fixed arms are other radial arms 11 equal in length to the arms 9 and hingedly or pivotally connected as at 12 at their inner ends to the hubs 8. Longitudinal slats 14 connect the ends of corresponding pairs of these arms 11, being adapted to hinge into contact with the longitudinally extending slats 10 on either side but are normally held, by connecting coil springs 15, against the longitudinally extending slat immediately preceding, in the direction of travel. When the pairs of longitudinal slats 10 and 14 are in this position the outer faces of each pair, i. e., the confronting sides of spaced slats, are corrugated with longitudinal ribs 16, as seen in Fig. 3, that are stepped on confronting spaced pairs so that when these corrugated sides of normally spaced pairs of slats are brought into engagement the ribs and grooves register alternately. These ribbed slats provide the flax gripping means when brought into contact with each other at and for a predetermined period by an expedient hereinafter described.

The reel 6 is supported in the usual way by the axle 7 journalled in bearings 17 on the standards or posts 18 mounted on the binder 5. A bevel pinion 19 on an upright shaft 20 driven by the drive wheels of the binder, engages a bevel gear on the adjacent end of the reel and on the movement of the binder causes the rotation of the reel.

A trip stop 21 is suitably located on each post 18 against which the hinged links or toggle hinges 22 connecting the normally contacting pairs of fixed and hinged arms 9 and 11 are adapted to strike. The links 22 hinged together in pairs have their free ends pivotally connected to normally adjacent pairs of arms respectively and in normal position are folded almost double in overlapped relation, their hingedly connected ends protruding forwardly, as an elbow, in the direction of travel. Consequently, on rotation of the reel, when these links 22 in normally folded position as indicated at 22$^a$ strike the trip stop 21 in their path, the same are opened against the action of the springs 15 to assume the position shown at 22$^b$. The hinged arm 11 supporting a member of the link 22 thus acted on, is thrown toward the fixed arm 9 normally spaced therefrom and the normally spaced pairs of slats 10 and 14 have their confronting corrugations brought into contact securely gripping the stalks of flax therebetween. (See Fig. 3.) These trip stops 21 are so formed and located that the normally spaced corrugated sides of the slats are brought tightly together to grip the flax stalks as they come nearly or directly below the reel axle or just about to the forward edge of the table and are held together until they have advanced over the table or platform A and pulled the stalks from the ground. Immediately the links 22 are free of the trip stops 21 the hinge arms 11 are drawn back by the springs 15 to normal position and the contacting corrugated sides of the slats 10 and 14 part, depositing the pulled flax on the table or platform A and are in position for the subsequent operation. As each successive fixed slat 10 on the reel advances to the table or platform A with its swath of stalks, the hinged arm carried slat 14 immediately preceding it is tripped back into contact with the slat 10 gripping between said pair of slats 10 and 14 all the flax stalks, gathered by the slat 10, and pulling them as in the operation just described.

To more effectively pull the stalks from the ground and to relieve the reel of undue strain that might result to impede its even progress if some stalks were more difficult to draw from the ground than others and pulled backwardly on the reel after the gripping slots had substantially passed bottom centre, I provide an auxiliary pulling element in the form of a kicker bar 24 hanging below the level of the binder table or platform A, by the straps 25 hinged to the posts 18, and extending the length of the superposing reel. A rod 26 extends across the back of the table or platform A having a crank arm 27 on its outer end that connects with the outer strap 25 by a push rod 28 while a second push rod 28 on the inner end of the table or platform A connecting with the inner post carried strip 25 is reciprocated by the rocking arm 29 fixed centrally to the rod 26. The remote end of this arm 29 is hinged to a connecting rod 30 from the crank 31 that is rotated by a shaft 32 from the drive mechanism of the harvesting implement. The drive action of this kicker bar is timed with the drive shaft 20 of the reel 6 so that the kicker bar 24 will operate in conjunction with the pulling slats thereof for it is desirable that this bar be kicked forward, striking the lower end of the stalk, below the engaging slats, only once and just as the stalk is about to leave the ground, thereby jerking the roots out smartly and enabling the reel to carry the same without effort and a minimum of energy over the table or platform A where it is deposited on the release of the gripping reel slats.

In operation, as the binder is caused to advance in a field of flax by any approved traction means, each fixed slat, on the rotating reel, gathers flax stalks, brushing them toward the binder table or platform A until the elbow link of the preceding hinged slat is tripped by the slot on the reel post and, coming into engagement with the fixed slat, grips therebetween the flax stalks that on the continued rotation of the reel are drawn from the ground having their roots jerked smartly out of the soil just as the stalks have been pulled taut, by the sudden advance of the reciprocating kicker bar. Immediately the elbow link clears the trip stop, the hinge slat is retracted to normal position freeing the pulled stalks of flax that are deposited on the table or platform A, conveyor, or the like, to be disposed of in any desired manner. Thus it is seen that as each respective pulling element performs its function it is automatically returned to normal position and is in place for succeeding operations.

From the foregoing description taken in connection with the accompanying drawings, it will be manifest that a flax pulling mechanism is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new and desire to secure by Letters Patent is:

1. A flax pulling mechanism including a reel comprising radially fixed arms and cooperating pivoted arms arranged in pairs with each of said pivoted arms normally spaced from the co-operative fixed arms; toggle hinges between each pivoted arm and its co-operative fixed arm; means for successively opening said toggle hinges and thereby drawing each pivoted arm into engagement with its co-operating arm, at times; and means to co-operate with said last mentioned arms in pulling the flax stalks.

2. A flax pulling mechanism including a reel rotatably mounted over one edge of a platform and comprising a hub with rigid arms arranged radially thereon and having longitudinal corrugations in one face; pivoted arms arranged between said rigid arms for co-operation therewith and having each longitudinal corrugation in its face opposed to the reel arm with which it co-operates; each of said pivoted arms being normally spaced from the rigid arm with which it co-operates and held therefrom by resilient means; a toggle hinge connected between each of said pivoted arms and the rigid arm with which it co-operates; means mounted on said platform to cause opening of each toggle hinge in succession and thus cause movement of each of said pivoted arms toward the rigid arm with which it co-operates as the latter moves toward said edge of the platform to advance thereon; and means operative below and forwardly of said edge of the platform for engagement with the flax stalks caught between each pair of arms and co-opoperation with said pairs of arms in pulling from the ground the caught flax stalks.

In testimony whereof I hereunto affix my signature.

THOMAS WALTER HALL.